United States Patent Office 3,277,084
Patented Oct. 4, 1966

3,277,084
3-AMINOTHIETE 1,1-DIOXIDES
James C. Martin, Kingsport, Tenn., assignor to Eastman Kodak Company, Rochester, N.Y., a corporation of New Jersey
No Drawing. Filed June 13, 1963, Ser. No. 287,483
12 Claims. (Cl. 260—247.1)

This invention relates to novel organic compounds and more particularly to 3-aminothiete 1,1-dioxides and their method of preparation.

The compounds of the invention are of the general formula:

$$\underset{(I)}{\overset{R-C-SO_2}{\underset{R}{\underset{|}{(R')_2N-C-C-R}}}}$$

The substituents R, taken singly, can be the same or different and can be hydrogen or monovalent hydrocarbyl radicals free of non-aromatic unsaturation and having up to about 8 carbon atoms, i.e., straight or branched chain alkyl or cycloalkyl radicals of 1 to 8 carbon atoms, and mononuclear aryl radicals with or without lower alkyl substituents, such as methyl, ethyl, propyl, i-pentyl, 2-ethylhexyl, cyclobutyl, cyclohexyl, phenyl, tolyl, benzyl, xylyl, and the like. The substituents R attached to a common carbon atom, taken collectively, can be joined lower alkylene radicals which, with the common carbon atom, form a saturated carbocyclic group having 4 to 6 ring carbon atoms as in cyclopentyl and cyclohexyl. Preferred substituents R are the straight and branched chain lower alkyl radicals.

The substituents R', taken singly, can be the same or different monovalent hydrocarbyl radicals free of non-aromatic unsaturation and having up to about 8 carbon atoms; e.g., alkyl or cycloalkyl of 1 to 8 carbon atoms of the types indicated above, preferably lower alkyl, or mononuclear aryl such as phenyl, benzyl, tolyl, xylyl, etc. The substituents R', taken collectively, are bivalent radicals which, with the nitrogen atom to which they are attached, form a heterocyclic group such as morpholino, thiamorpholino, pyrrolidinyl, piperidino, or such a group having a lower alkyl substituent on at least one of its carbon atoms.

The method of the invention, by which the novel compounds are prepared, in general comprises combining in the presence of a hydrogen halide acceptor, and preferably in an inert solvent, an alkyl or aryl sulfonyl chloride or bromide and a ketene animal or O,N-acetal. The resulting product is then isolated, e.g., by distillation or recrystallization. The reaction can be represented by the following equation:

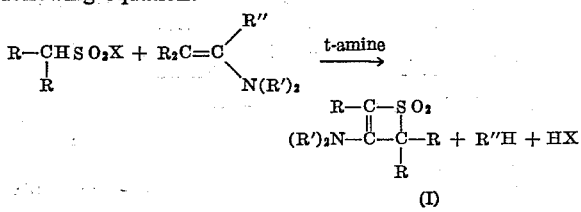

and more specifically by the following two equations of which (1) employs a ketene O,N-acetal and (2) employs a ketene aminal (sometimes called a ketene N,N-acetal):

(1)

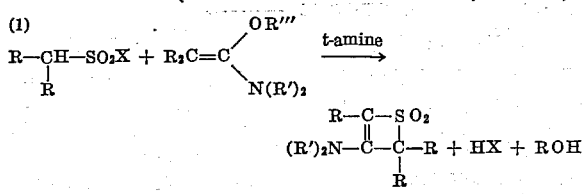

and (2)

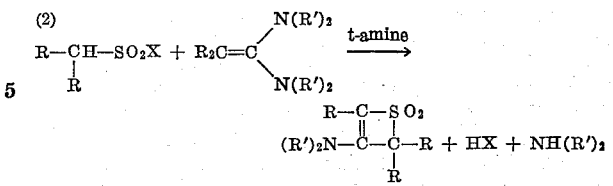

In these equations at least one of the substituents R of the reactants must be hydrogen. Otherwise R and R' have the same meanings as indicated above. R" is —OR''' or —N(R')$_2$; R''' is alkyl of 1 to 8 carbon atoms, preferably lower alkyl; and X is chlorine or bromine.

The above equations show the preparation of the principal reaction product, i.e., the novel 3-aminothiete 1,1-dioxide (I). However, I have found that the reaction also produces a minor amount of an acyclic product, which in the reaction of Equation 1 has the structure

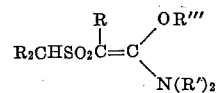

and in the reaction of Equation 2 has the structure

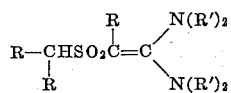

As indicated by the formula, R$_2$CH–SO$_2$X, the sulfonyl halide must have at least one hydrogen on the carbon atom adjacent to the sulfur atom. The sulfonyl chlorides are greatly preferred for economic reasons although for some reactions the bromides can be advantageous. Typical sulfonyl halides that are suitable include: methanesulfonyl chloride, methanesulfonyl bromide, ethanesulfonyl chloride, 2-propanesulfonyl chloride, 1-hexanesulfonyl chloride, 5-nonanesulfonyl chloride, diphenylmethanesulfonyl chloride, etc.

Suitable procedures for preparing the ketene aminals used in the method of the invention are disclosed by Baganz et al., Ber. 95, 2095 (1962), and by the earlier references cited therein. Examples of suitable ketene aminals for the method of the invention include: 4,4'-vinylidenemorpholine, 1,1'-vinylidenedipiperidine, N,N'-vinylidene bis(dimethylamine), 1,1'-vinylidenedipyrrolidine, N,N'-vinylidene bis(N-methylaniline), 4,4'-propenylidenedimorpholine, 4,4'-(1-butenylidene)dimorpholine, 4,4'-(1-isobutenylidene)dimorpholine, N,N'-vinylidene bis(dibutylamine), etc.

Suitable procedures for preparing the ketene O,N-acetals used in the method of the invention are disclosed by Meerwein et al., Ann. 641, 9 (1961), and by the earlier references cited therein. Examples of suitable ketene O,N-acetals for the method of the invention include: 1-ethoxy-N,N-dimethylvinylamine, 1-(1-methoxyvinyl)piperidine, 1-(1-butoxyvinylamine, 1-ethoxy-2,N,N-trimethyl-1-propenylamine, 1-ethoxy-N,N-dimethyl-2-phenylvinylamine, 1-ethoxy-N,N-dimethyl-2,2-diphenylvinylamine, 1-ethoxy-N,N-dimethyl-1-butenylamine, 1-ethoxy-N,N-dimethyl-1-decenylamine, 1-ethoxy-N-methyl-N-phenylvinylamine, etc.

The method of the invention requires the use of a hydrogen halide acceptor to take up the hydrogen halide released by the sulfonyl halide. Any of the basic hydrogen halide acceptors used by organic chemists can be employed. Preferably I employ tertiary amines of which the following are illustrative: trimethylamine, triethylamine, triethylenediamine, pyridine, quinoline, tetramethylethylene, diamine, N,N'-dimethylpiperazine, N,N-dimethylaniline, picoline, lutidine, N-alkyl piperidines, N-alkyl morpholines, etc.

The method of my invention can be operated at temperatures from about −20° to 150° C. or higher. Some of the less reactive ketene acetals and sulfonyl chlorides require temperatures near the upper end of this range and temperatures above 0° C. are normally preferred.

Although not essential, I prefer to use a solvent for the reaction. Suitable solvents include those that do not react with the products or the starting materials. Of particular use as inert solvents are ethers, such as diethyl ether, diisopropyl ether, dioxane, tetrahydrofuran, and 1,2-diethoxyethane. Examples of other inert solvents that can be used include aliphatic and aromatic hydrocarbons, e.g., pentane, hexane, benzene, xylene; chlorinated hydrocarbons such as carbon tetrachloride; esters; nitriles; etc.

The preferred order of addition of the reactants is to mix the solvent, the tertiary amine and the ketene O,N-acetal or aminal and to add the sulfonyl halide to this solution. Other sequences of addition can also be used, such as simultaneous addition of the sulfonyl halide and the ketene O,N-acetal or aminal to the tertiary amine in the solvent. Normally the molar ratio of sulfonyl halide to aminal is 1:1, but if desired an excess of either reactant can be used. An excess of sulfonyl halide is often advantageous and the preferred molar ratio of sulfonyl halide to ketene O,N-acetal or aminal is from 1:1 to 2:1.

The tertiary amine is generally employed to excess ranging from 10% to several hundred percent excess. In fact, the excess amine can be employed as the solvent because after the stoichiometric amount of amine has combined with the hydrogen halide the unreacted excess amine is inert.

The method and products of the invention are illustrated by the following examples.

*Example 1*

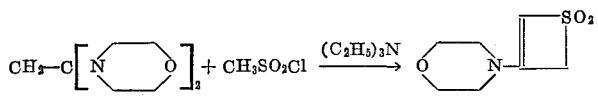

A solution of 19.8 g. (0.1 mole) of 4,4′-vinylidenedimorpholine and 10.1 g. (0.1 mole) of anhydrous triethylamine in 50 ml. of anhydrous tetrahydrofuran was stirred under a nitrogen atmosphere at −2 to +2° while a solution of 11.5 g. (0.1 mole) of methanesulfonyl chloride in 30 ml. of anhydrous tetrahydrofuran was added during 1 hr. The resulting suspension was stirred at 25° for 15 hr. The solids were separated by filtration and then continuously extracted with tetrahydrofuran. Vacuum concentration of the combined filtrate and extracts gave 15.8 g. (84%) of white crystals of 3-morpholinothiete 1,1-dioxide, M.P. 120–133° C. A sample recrystallized from ethanol melted at 140–142°. *Analysis.*—Calcd. for $C_7H_{11}NO_3S$: C, 44.5; H, 5.9; N, 7.4. Found: C, 44.9; H, 6.0; N, 7.5.

In the above reaction a minor amount of the acyclic by-product

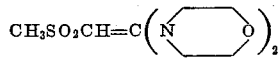

is also obtained. Corresponding acyclic by-products, though not mentioned, are also obtained in Examples 2–6.

*Example 2*

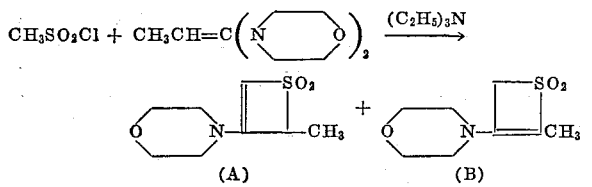

Under the conditions of Example 1, 21.2 g. (0.1 mole) of 4,4′-propenylidenedimorpholine, 11.1 g. of triethylamine and 11.5 g. (0.1 mole) of methanesulfonyl chloride and 50 ml. of tetrahydrofuran give 16.1 g. of solid melting at 88–129°. Analysis of the n.m.r. spectrum indicates this crude solid is a mixture of about 60% A and 40% B. Pure, B, 2-methyl-3-morpholinothiete, 1,1-dioxide, M.P. 145–145.5°, is obtained by recrystallization of the mixture from benzene. Analysis of B—Calcd. for $C_8H_{13}NO_3S$: C, 47.3; H, 6.4; N, 6.9; S, 15.8. Found: C, 47.2; H, 6.4; N, 6.7; S, 15.5.

*Example 3*

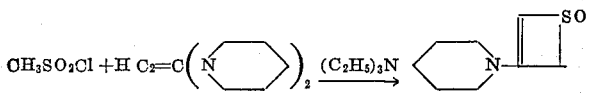

Under the general conditions of Example 1, 19.4 g. (0.1 mole) of 1,1′-vinylidenedipiperidine, 11.1 g. (0.11 mole) of triethylamine, 11.5 g. (0.1 mole) of methanesulfonyl chloride and 75 ml. of tetrahydrofuran give 19.2 g. of crude 3-piperidinothietene 1,1-dioxide. An analytical sample, recrystallized from benzene, melts at 106–109°. *Analysis.*—Calcd. for $C_8H_{13}NO_2S$: C, 51.3; H, 7.0; N, 7.5; S, 17.1. Found: C, 51.2; H, 7.0; N, 7.3; S, 17.4.

*Example 4*

Under the general conditions of Example 1, 21.2 g. (0.1 mole) of 4,4′-vinylidenedimorpholine, 21.4 g. (0.11 mole) of tributylamine and 11.5 g. (0.1 mole of methanesulfonyl chloride and 75 ml. of dioxane give 14.7 g. of 3-morpholinothiete 1,1-dioxide.

*Example 5*

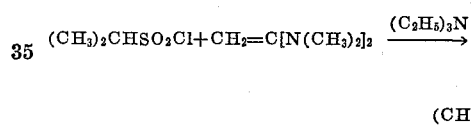

Under the general procedure of Example 1, 17.5 g. (0.1 mole) of isopropanesulfonyl chloride, 11.1 g. (0.11 mole) of triethylamine, 11.4 g. (0.1 mole) of N,N′-vinylidenebis(dimethylamine) in refluxing ethyl acetate give 15.3 g. of crude 4,4-dimethyl-3-dimethylaminothiete 1,1-dioxide. A sample for analysis is recrystallized from ethanol to give a white solid melting at 135–136°. *Analysis.*—Calcd. for $C_7H_{13}NO_2S$: C, 48.0; H, 7.5; N, 8.0; S, 18.3. Found: C, 48.2; H, 7.2; N, 7.8; S, 18.1.

*Example 6*

Under the general procedure of Example 1, the following sulfonyl chlorides and ketene aminals are combined to give the products shown:

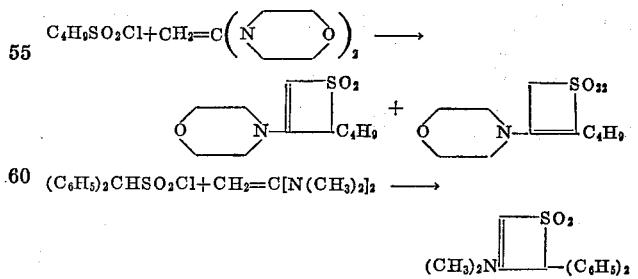

*Example 7*

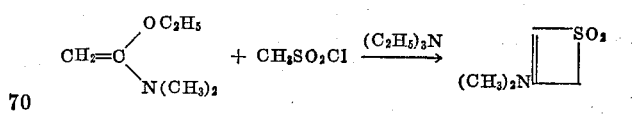

To a stirred solution of 30 g. (0.26 mole) of 1-ethoxy-N,N′-dimethylvinylamine and 53 g. (0.52 mole) of triethylamine in 500 ml. of ether was added 29 g. (0.26 mole) of methanesulfonylchloride in 50 ml. of ether. The reaction temperature was kept at 20–25° by using a wet ice bath. The mixture was stirred for 2 hrs. after the addition. The solid was removed by filtration and extracted thoroughly with ether. Evaporation of the ether gave 30 g. of waxy solid. A sample of this was recrystallized from ethyl alcohol to give 3-dimethylaminothiete 1,1-dioxide, M.P. 121–123°. *Analysis.*—Calcd. for $C_5H_9NO_2S$: C, 40.8; H, 6.1; N, 9.5; S, 21.7. Found: C, 40.8; H, 6.3; N, 9.4; S, 21.7. Infrared maximum at 6.1µ. The nuclear magnetic resonance spectrum was in complete agreement with this structure.

In the above reaction a minor amount of the acyclic by-product

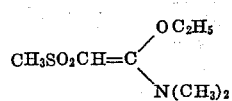

is also obtained. Corresponding acyclic by-products, though not mentioned, are also obtained in Examples 8–10.

Example 8

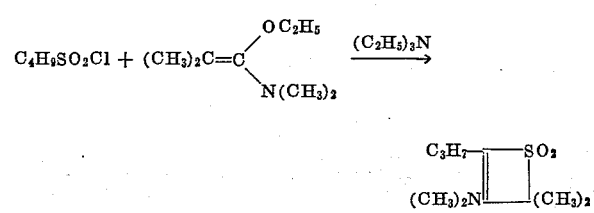

To a stirred solution of 11.9 g. (0.1 mole) of 1-ethoxy-N,N-dimethylisobutenylamine and 11.1 g. (0.11 mole) of triethylamine in 50 ml. of tetrahydrofuran is added 15.7 g. (0.1 mole) of butanesulfonyl chloride. The reaction temperature is kept at −2 to +2° during the addition. After the addition is complete, the reaction mixture is stirred at room temperature for 4 hrs. The solid that precipitates is removed by filtration and the filtrate is evaporated to yield 22.6 g. of liquid residue. Distillation of this material in a molecular still at 75° (1µ) gives a viscous product that readily solidifies. Recrystallization of this solid from butyl ether gives 2-butyl-3-dimethylamino-4,4-dimethylthiete 1,1-dioxide, M.P. 59–60.5° C. *Analysis.*—Calcd. for $C_{10}H_{19}NO_2S$: C, 55.3; H, 8.8; N, 6.4; S, 14.8. Found: C, 55.3; H, 8.8; N, 6.5; S, 15.0.

Example 9

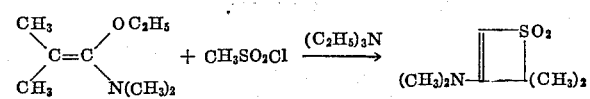

A solution of 14.4 g. (0.121 mole) of N,N-dimethyl-1-ethoxyisobutenylamine and 13.1 g. (0.13 mole) of anhydrous triethylamine in 50 ml. of anhydrous tetrahydrofuran is stirred under a nitrogen atmosphere at −2 to +2° while a solution of 13.9 g. (0.121 mole) of methanesulfonyl chloride in 30 ml. of anhydrous tetrahydrofuran is added during 35 minutes. The resulting suspension is stirred at 25° for 15 hrs. The solid triethylamine hydrochloride is separated by filtration and washed with anhydrous tetrahydrofuran. Vacuum concentration of the combined filtrate and washings leaves a partially crystalline residue, from which 12.2 g. (58%) of 2,2-dimethyl-3-dimethylaminothiete 1,1-dioxide, M.P. 134–136°, is obtained by washing with benzene and a small amount of ethanol. *Analysis.*—Calcd. for $C_7H_{13}NO_2S$: C, 48.0; H, 7.5; N, 8.0; S, 18.3. Found: C, 48.2; H. 7.2; N, 7.8; S, 18.1.

Example 10

Under the general conditions of Example 7, the following sulfonyl chlorides and ketene O,N-acetals give the products shown:

| Sulfonyl Chloride | Ketene O,N Acetal | Product |
|---|---|---|
| $(CH_3)_2CHSO_2Cl$ | 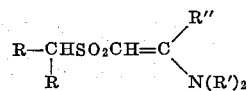 | 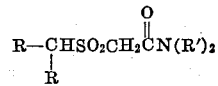 |
| $CH_3SO_2Cl$ | | |
| $CH_3SO_2Cl$ | | |

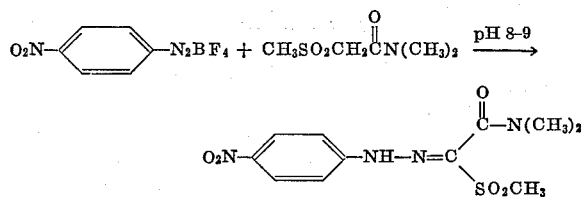

The compounds of the invention are useful as chemical intermediates. For example, by heating in dilute aqueous solution of a mineral acid they can be hydrolyzed to 3-thietanone 1,1-dioxides, as disclosed in my copending United States Application Serial No. 274,850, filed April 22, 1963, entitled "3-Thietanone 1,1-Dioxides." The latter compounds are also valuable chemical intermediates. They can be combined with so-called I.C.I. intermediates to form cyanine dyes useful as photographic spectral sensitizing dyes and with alcohols to form aliphatic alkyl sulfonyl esters useful as dye intermediates, all of which is disclosed in said copending application.

The acyclic compounds prepared in accordance with the invention are also useful as chemical intermediates. These compounds $$R-CHSO_2CH=C\begin{matrix}R''\\ \\N(R')_2\end{matrix}$$
$$\phantom{R-CH}R$$

are hydrolyzed to amides of the type $$R-CHSO_2CH_2\overset{O}{\overset{\|}{C}}N(R')_2$$
$$\phantom{R-}R$$

This type of amide, having an active methylene group between the sulfonyl and carbonyl groups, can be used as an intermediate for dyes in the manner disclosed by S. Hünig and O. Boes, Ann., 579, 28 (1953), e.g.,

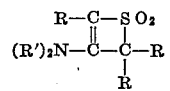

Although the invention has been described in considerable detail with particular reference to certain preferred embodiments thereof, it will be understood that variations and modifications can be effected within the spirit and scope of the invention as described hereinabove, and as defined in the appended claims.

I claim:
1. A compound of the formula

$$\begin{matrix}R-C-SO_2\\ \| \ \ |\\(R')_2N-C-C-R\\ \ \ \ \ \ \ \ \ \ \ |\\ \ \ \ \ \ \ \ \ \ \ R\end{matrix}$$

wherein:
(1) the substituents R are selected from the class consisting of
(a) hydrogen, and (b) alkyl, cycloalkyl or monocarbocyclic aryl pyrolidinyl, piperidino, and such groups having
(2) the substituents R'
 (a) taken singly, are alkyl cycloalkyl or monocarbocyclic aryl having up to about 8 carbon atoms, and
 (b) taken collectively, are bivalent radicals which, with the nitrogen atom to which they are attached, form a heterocyclic group from the class consisting of morpholino, thiamorpholino, pyrrolidinyl, piperidino, and such groups having lower alkyl substituents on at least one of their carbon atoms.

2. A compound of the formula

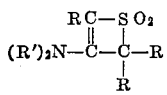

wherein
(1) the substituents R are hydrogen or lower alkyl and
(2) the substituents R'
 (a) taken singly, are alkyl, cycloalkyl or monocarbocyclic aryl having up to about 8 carbon atoms, and
 (b) taken collectively, are bivalent radicals which, with the nitrogen atom to which they are attached, form a heterocyclic group from the class consisting of morpholino, thiamorpholino, pyrrolidinyl, piperidino and such groups having lower alkyl substituents on at least one of their carbon atoms.

3. 3-morpholinothiete 1,1-dioxide.
4. 2-methyl-3-morpholinothiete 1,1-dioxide.
5. 3-piperidinothiete 1,1-dioxide.
6. 4,4-dimethyl-3-dimethylaminothiete 1,1-dioxide.
7. 3-dimethylaminothiete 1,1-dioxide.
8. 2-butyl-3-dimethylamino-4,4-dimethylthiete 1,1-dioxide.
9. 2,2-dimethyl-3-dimethylaminothiete 1,1-dioxide.

10. The method of preparing 3-aminothiete 1,1-dioxides which comprises combining an alkyl or monocarbocyclic aryl sulfonyl halide having up to 8 carbon atoms and having at least one hydrogen atom on the carbon adjacent to the sulfur atom with a compound from the group consisting of ketene O,N-acetals and ketene aminals in the presence of a hydrogen halide acceptor.

11. The method of preparing a compound of the formula which comprises combining a sulfonyl halide of the

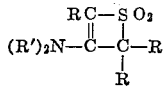

formula, $R_2CHSO_2X$, with a compound of the formula,

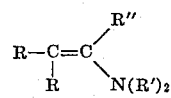

in the presence of a tertiary amine; wherein
(1) the substituents R are selected from the class of
 (a) hydrogen, and
 (b) alkyl, cycloalkyl or monocarbocyclic aryl having up to about 8 carbon atoms; and
(2) the substituents R'
 (a) taken singly, are alkyl, cycoalkyl or monocarbocyclic aryl having up to about 8 carbon atoms, and
 (b) taken collectively, are bivalent radicals which, with the nitrogen atom to which they are attached, form a heterocyclic group from the class consisting of morpholino, thiamorpholino, pyrrolidinyl, piperidino and such groups having lower alkyl substituents on at least one of their carbon atoms.

12. A method of preparing a compound of the formula

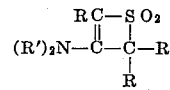

which comprises combining a sulfonyl chloride of the formula $R_2CHSO_2Cl$, with a compound of the formula,

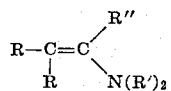

in an inert solvent and in the presence of a tertiary amine at a temperature of —20 to 150° C; wherein R is selected from the group consisting of hydrogen and alkyl, cycloalkyl or monocarbocyclic aryl of up to about 8 carbon atoms; the substituents R' are alkyl, cycloalkyl or monocarbocyclic aryl of up to about 8 carbon atoms; R" is selected from the group consisting of —OR''' and —N(R')$_2$, and R''' is alkyl of up to about 8 carbon atoms.

No references cited

ALEX MAZEL, *Primary Examiner.*

HENRY R. JILES, *Examiner.*

JOSE TOVAR, *Assistant Examiner.*

UNITED STATES PATENT OFFICE
CERTIFICATE OF CORRECTION

Patent No. 3,277,084　　　　　　　　　　　　　　October 4, 1966

James C. Martin

It is hereby certified that error appears in the above numbered patent requiring correction and that the said Letters Patent should read as corrected below.

Column 1, lines 13 to 17, the formula should appear as shown below instead of as in the patent:

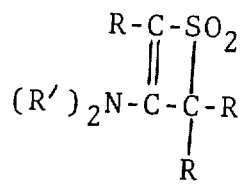

column 1, line 49, for "animal" read -- aminal --; column 3, lines 34 to 40, under Example 1, for that portion of the formula reading

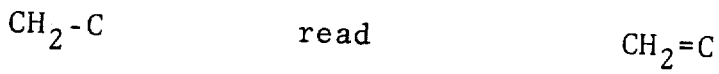

column 4, lines 35 to 39, under Example 5, lower right-hand corner, for "$(CH_3)$" read -- $(CH_3)_2$ --; lines 54 to 58, under Example 6, upper right-hand corner, for "$SO^{22}$" read -- $SO_2$ --; column 7, line 2, strike out "pyrolidinyl, piperidino, and such groups having" and insert instead -- having up to about 8 carbon atoms; and --.

Signed and sealed this 29th day of August 1967.

(SEAL)
Attest:

ERNEST W. SWIDER
Attesting Officer

EDWARD J. BRENNER
Commissioner of Patents